United States Patent [19]

Nakagawa et al.

[11] Patent Number: 4,890,220

[45] Date of Patent: Dec. 26, 1989

[54] VECTOR PROCESSING APPARATUS FOR INCREMENTING INDICES OF VECTOR OPERANDS OF DIFFERENT LENGTH ACCORDING TO ARITHMETIC OPERATION RESULTS

[75] Inventors: Yaoko Nakagawa; Koichi Ishii, both of Hadano, Japan

[73] Assignee: Hitachi, Ltd., Tokyo, Japan

[21] Appl. No.: 806,801

[22] Filed: Dec. 10, 1985

[30] Foreign Application Priority Data

Dec. 12, 1984 [JP] Japan .................. 59-260708
Feb. 14, 1985 [JP] Japan .................. 60-26893

[51] Int. Cl.⁴ .................................................. G06F 7/06
[52] U.S. Cl. .......................... 364/200; 364/232.21; 364/749
[58] Field of Search ............... 364/200, 900, 730, 736, 364/749

[56] References Cited

U.S. PATENT DOCUMENTS

| | | | |
|---|---|---|---|
| 2,987,705 | 6/1961 | Van Mechelen | 364/900 |
| 3,161,764 | 12/1964 | Croy | 364/749 |
| 3,428,946 | 2/1969 | Batcher | 364/900 |
| 3,541,516 | 11/1970 | Senzig | 364/200 |
| 3,573,851 | 4/1971 | Watson et al. | 364/200 |
| 3,775,753 | 11/1973 | Kastner | 364/200 |
| 3,827,031 | 7/1974 | Kastner et al. | 364/200 |
| 4,128,880 | 12/1978 | Cray, Jr. | 364/200 |
| 4,172,287 | 10/1979 | Kawabe et al. | 364/200 |
| 4,293,941 | 10/1981 | Muraoka et al. | 364/200 |
| 4,435,765 | 3/1984 | Uchida et al. | 364/200 |
| 4,490,786 | 12/1984 | Nakatani | 364/200 |
| 4,525,796 | 6/1985 | Omoda et al. | 364/730 |
| 4,541,046 | 9/1985 | Nagashima | 364/200 |
| 4,594,682 | 6/1986 | Drimak | 364/900 |
| 4,617,625 | 10/1986 | Nagashima et al. | 364/200 |
| 4,620,275 | 10/1986 | Wallach et al. | 364/200 |
| 4,641,275 | 2/1987 | Hatakeyama et al. | 364/900 |
| 4,651,274 | 3/1987 | Omoda et al. | 364/200 |

FOREIGN PATENT DOCUMENTS 0126247 11/1984 European Pat. Off. .......... 364/200

OTHER PUBLICATIONS

IBM Technical Disclosure Bulletin, vol. 27, No. 7A, Dec. 1984, pp. 4061–4063.

Primary Examiner—Gareth D. Shaw
Assistant Examiner—Paul Kulik
Attorney, Agent, or Firm—Antonelli, Terry & Wands

[57] ABSTRACT

The vector processing apparatus fetches vector operands designated by an instruction from a storage to an operand buffer in a vector processor. The vector processor reads out and processes the elements of the vector operands stored in the operand buffer. The vector processor controls fetching of the element to be next processed from the operand buffer in accordance with the operation result. Thus, a vector operation of a type in which the increment of the indices of the vector operands depends on the operation result is carried out.

6 Claims, 14 Drawing Sheets

VECTOR PROCESSING APPARATUS FOR INCREMENTING INDICES OF VECTOR OPERANDS OF DIFFERENT LENGTH ACCORDING TO ARITHMETIC OPERATION RESULTS

BACKGROUND OF THE INVENTION

The present invention relates to a vector processing apparatus.

A vector processing apparatus which is a combination of a general purpose scalar data processing unit and an operation unit for processing vector elements has been described in U.S. Pat. No. 4,172,287. In such a vector processing apparatus, indices of vector operands are uniformly incremented to process the vector elements. However, in the vector processing in which the increment of the indices of the vector operands depends on the operation result of the data, a high speed vector operation can not be attained with the disclosed apparatus.

SUMMARY OF THE INVENTION

It is an object of the present invention to provide a vector processing apparatus which performs a vector operation of a type in which an increment of vector indices depends on an operation result of data.

In accordance with the present invention, vector operands designated by an instruction are sequentially fetched from a memory to a vector processing unit and held in a buffer in the vector processing unit. The vector processing unit reads out elements of the vector operands from the buffer and operates on them, for example, compares two elements. In accordance with an operation result, the vector processing unit controls the fetching of the vector elements to be processed next, from the buffer.

DESCRIPTION OF THE PREFERRED EMBODIMENTS

Figure 1:
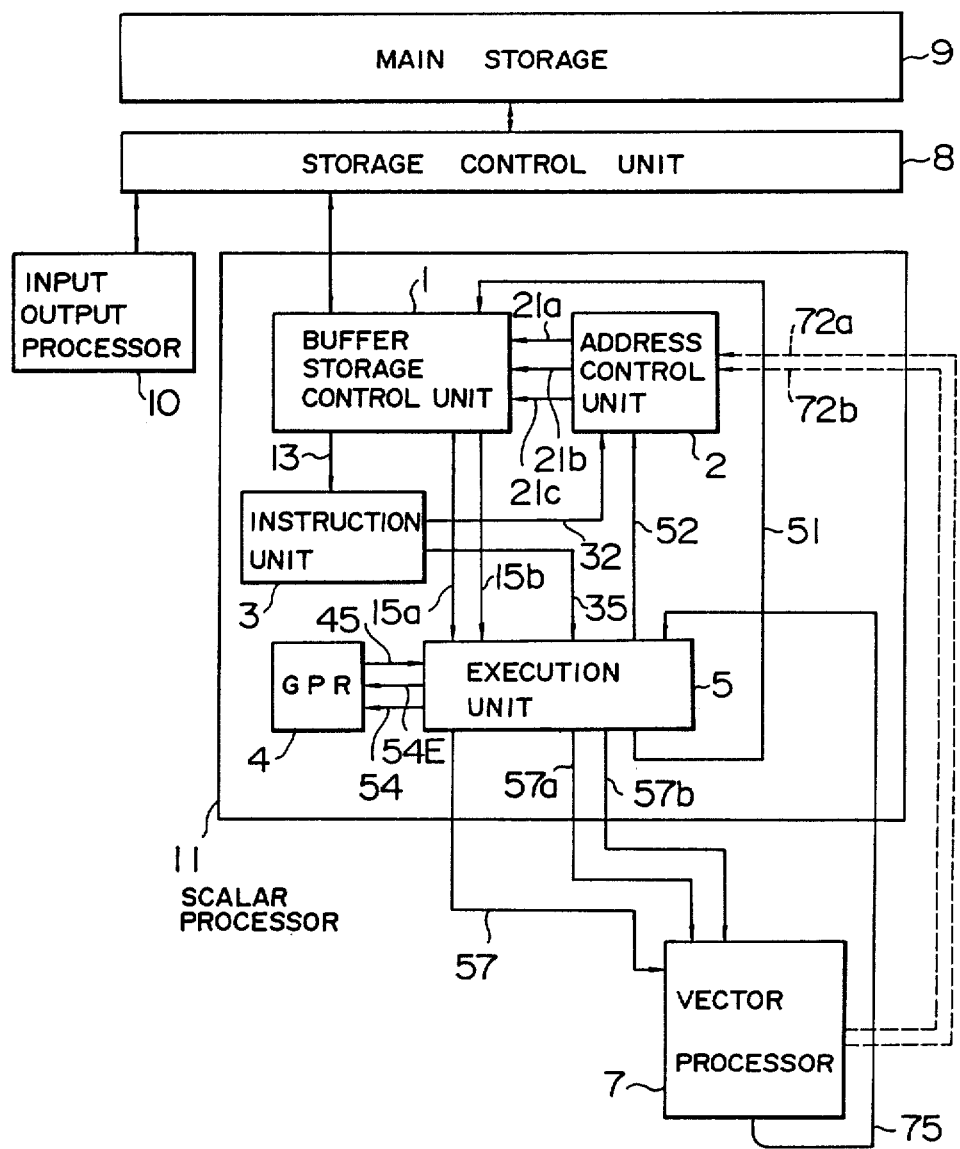
FIG. 1 is a block diagram of one embodiment of the present invention.

FIG. 1 shows an overall configuration of one embodiment of the present invention. Numeral 9 denotes a main storage, numeral 8 denotes a storage control unit, numeral 10 denotes an input/output processor, numeral 11 denotes a scalar processor, and numeral 7 denotes a vector processor for exclusively processing vector data.

Prior to the explanation of an execution of a vector instruction in FIG. 1, a MERGE SORT instruction is explained.

Figure 2:
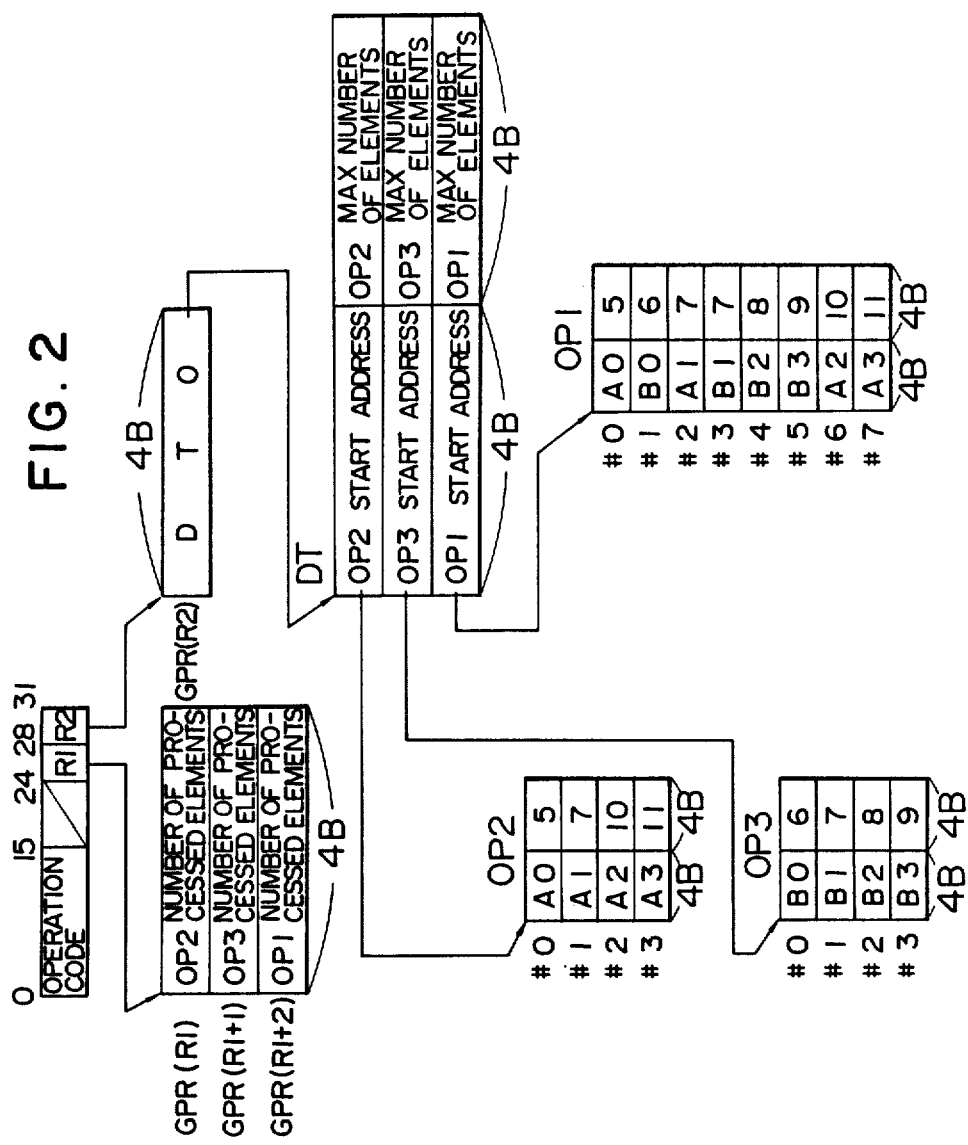
FIG. 2 shows a MERGE SORT instruction format and an operation of the instruction.

FIG. 2 shows a MERGE SORT instruction format and the operation thereof. The MERGE SORT instruction has a four-byte (4B) length. The 0-15th bits of the instruction include an operation code which specifies the MERGE SORT instruction. The 16th-23rd bits of the instruction have no meaning. The numbers of processed elements of vector operands are contained in three general purpose registers having serial numbers starting from the number specified by the 24-27th bits (R1 field) of the instruction. A description table origin (DTO) of a description table (DT) is contained in a general purpose register having the number specified by the 28th-31th bits (R2 field) of the instruction. The general purpose registers are provided in a general purpose register unit 4. The DT specified by the DTO is in the main storage 9 and contains start addresses of the vector operands and maximum number of elements thereof. The vector operand indirectly specified by the DT includes a first four-byte integer field without a sign for identifying data and a second four-byte numeric data field to be sorted. In FIG. 2, Maximum number of elements for OP2=4

Maximum number of elements for OP3=4

Maximum number of elements for OP1=8 where OP2, OP3 and OP1 represent second, third and first operands, respectively.

In the MERGE SORT instruction, the OP2 element and the OP3 element are compared and the smaller one of the two is stored. (If both are equal, the OP2 element is stored.) For example, in FIG. 2, the #0 data field of OP2 and the #0 data field of OP3 are compared and the data of the OP2 is selected and stored. The next comparison is made between the next element of the selected operand and the previous element of the nonselected operand. In the example of FIG. 2, the #1 data field of OP2 and the #0 data field of OP3 are compared. This operation is continued until all elements of OP2 and OP3 are stored.

Thus, the MERGE SORT instruction can be considered as an instruction to produce a longer sorted vector from two shorter sorted vectors. The MERGE SORT instruction is effective in table sorting in a relational data base. The MERGE SORT instruction is a vector instruction of a type in which the increment of the numbers of processed elements of OP2 and OP3 depends on the comparison result of the element-by-element comparison of OP2 and OP3.

Figure 3:
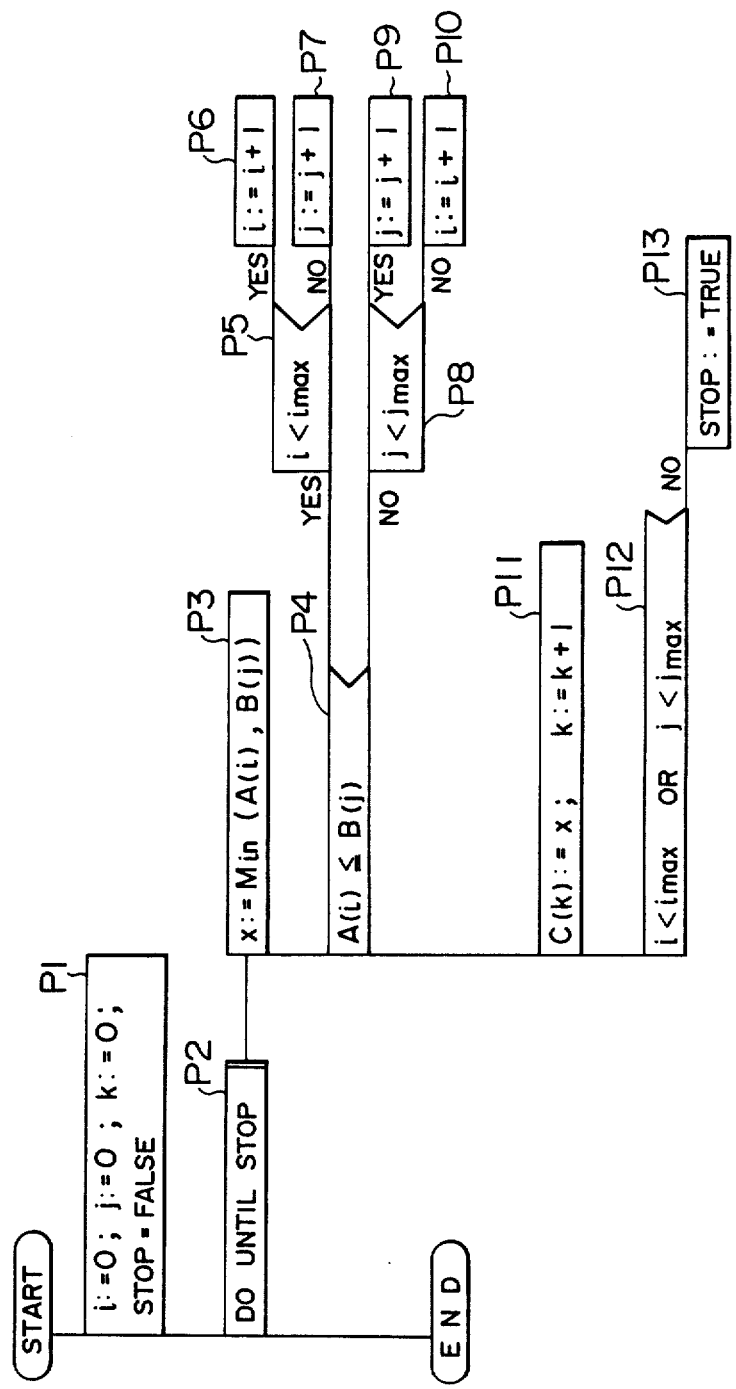
FIG. 3 is a Program Analysis Diagram for illustrating the operation of the MERGE SORT instruction.

FIG. 3 shows an operation of the MERGE SORT instruction by a Program Analysis Diagram (PAD). Symbols used in FIG. 3 correspond to those of FIG. 2 as follows.

OP2 second (rear part of each element) 4 bytes ← → A(i)

OP3 second (rear part of each element) 4 bytes ← → B(j)

OP1 second (rear part of each element) 4 bytes ← → C(k)

OP2 number of processed elements ← → i

OP3 number of processed elements ← → j

OP1 number of processed elements ← → k

OP2 maximum number of elements ← → $i_{max}$

OP3 maximum number of elements ← → $j_{max}$

In FIG. 3:
P1: Set i, j and k to 0. Set STOP to false. Go to P2.
P2: Execute P3 and et seq. until STOP becomes true.
P3: Put smaller one of A(i) and B(j) to x. Go to P4.
P4: If A(i)≦B(j) in P3, then go to P5. If not A(i)≦B(j), then go to P8.
P5: If i<$i_{max}$, then go to P6. If not i<$i_{max}$, then go to P7.
P6: Add one to i and go to P11.
P7: Add one to j and go to P11.
P8: If j<$j_{max}$, then go to P9, otherwise go to P10.
P9: Add one to j and go to P11.
P10: Add one to i and go to P11.
P11: Put x to C(k). That is, put the smaller one of A(i) and B(j) to C(k). Add one to k. Go to P12.
P12: If i<$i_{max}$ or j<$j_{max}$, then go to P3, otherwise indicates that the maximum number of elements specified by the OP2 or OP3 have been processed. Go to P13.
P13: Set STOP to true.

The end of the processing in P12 may be arbitrarily defined. For example, it may be terminated on the condition of "k<$k_{max}$". Thus, in the MERGE SORT instruction, the increments of i and j are not uniform and depend on the comparison result of A(i) and B(j).

Referring back to FIG. 1, the instruction fetched from the buffer storage control unit 1 through a path 13 is decoded by an instruction unit 3. If the decoding indicates that it is a MERGE SORT instruction, the instruction unit 3 informs the execution unit 5 of the MERGE SORT instruction and indicates the register numbers (R1 and R2 fields) to be used, through a path 35 and passes the control to the scalar execution unit 5.

The scalar execution unit 5 sends the register numbers in the R1 and R2 fields indicated by the instruction unit 3 to the GPR 4 through a path 54E to read out the content of the GPR 4 through a path 45.

Figure 4:
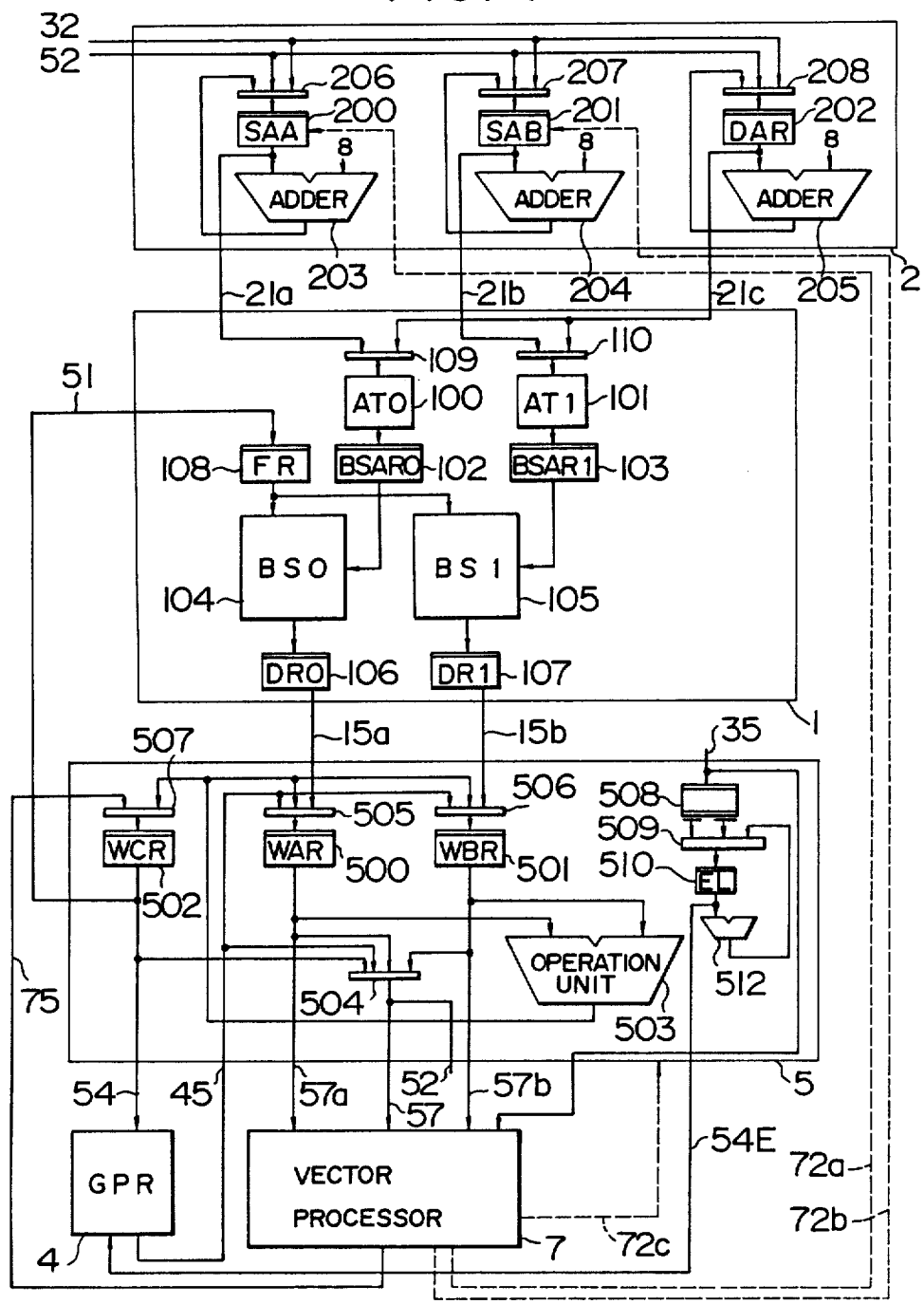
FIG. 4 is a block diagram showing a detail of FIG. 1.
Figure 5:
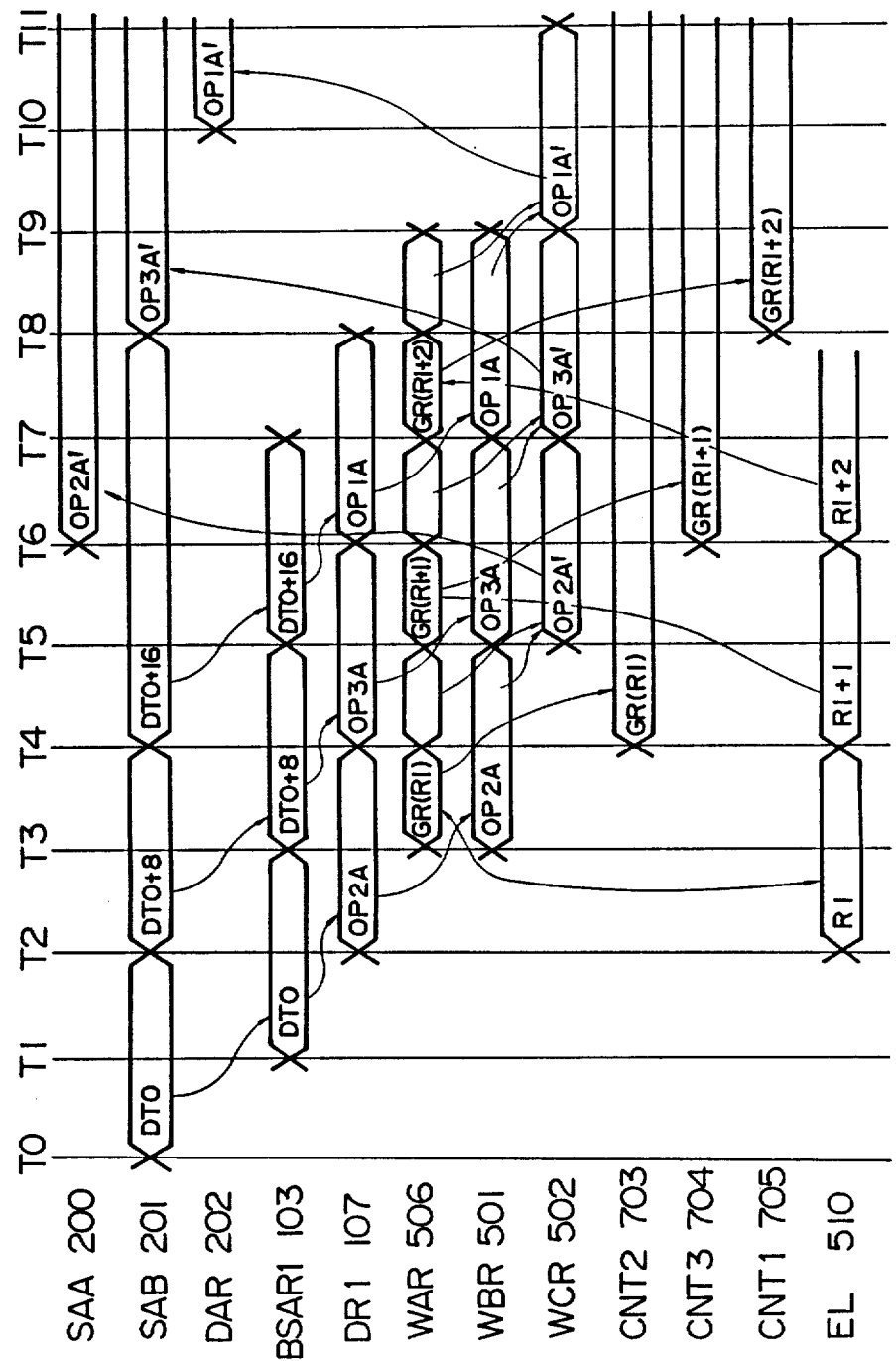
FIG. 5 is a time chart for illustrating an operation of FIG. 4.

FIG. 4 shows a detailed configuration of the address control unit 2, buffer storage control unit 1 and execution unit 5 of FIG. 1. FIG. 5 is a time chart for illustrating the operation of FIG. 4. The operation of FIG. 1 is explained in detail with reference to FIGS. 4 and 5.

In FIG. 5:
OP2A represents a start address of the OP2.
OP3A represents a start address of the OP3.
OP1A represents a start address of the OP1.
GR(R1) represents the number of processed elements of the OP2.
GR(R1+1) represents the number of processed elements of the OP3.
GR(R1+2) represents the number of processed elements of the OP1.
OP2A' represents a start address of the unprocessed elements of the OP2.
OP3A' represents a start address of the unprocessed elements of the OP3.
OP1A' represents a start address of the unprocessed elements of the OP1.

Referring to FIG. 4, the register numbers in the R1 and R2 fields transferred from the instruction unit 3 through the path 35 are set in a register 508. The operation code is sent to the vector processor 7. A selector 509 first selects the R2 field and sets the content of the R2 field into an EL register 510. The content of the EL 510 is sent to the GPR 4 through the path 54E, reads out the DTO through the path 45 and sets it into a work register B (WBR) 501 through a selector 506. The DTO set in the WBR 501 is selected by a selector 504 and it is set in a fetch-only address register B(SAB) 201 (FIG. 5) in the address control unit 2 through a selector 207.

Another fetch-only address register (SAA) 200 is provided in the address control unit 2 so that those registers correspond to two address translation units and two buffer storages in the buffer storage control unit 1. Those two address translation units and two buffer storages are functionally identical, respectively, and they are duplicated to attain a high speed processing of the elements. The dual units are referred to as 0-system and 1-system. In the following description, the DTO fetch uses the 1-system. The content (DTO) of the SAB 201 is sent to the buffer storage control unit 1 through a path 21b. The DTO is translated by the address translation unit AT1 101 from a virtual address to a real address, which is set in a buffer storage address register BSAR1 103. (FIG. 5 T1). The buffer storage BS1 105 is accessed by the content (DTO) of the BSAR1 103 and the data read therefrom is set in the 8-byte readout data register DR1 107 (FIG. 5 T2). As a result, the start address of the OP2 is set in the first four bytes of the DR1 107 and the maximum number of elements of the OP2 is set in the second four bytes. The data read from the DR1 107 is sent to the scalar execution unit 5 through the path 15b.

The buffer storages BS0 104 and BS1 105 contain partial copies of the main storage. If the data to be accessed is not in the buffer storages, the data is transferred from the main storage unit 9 under the control of the buffer storage control unit 1.

The scalar execution unit 5 sets the data sent through the path 15b in the WBR 501 (FIG. 5 T3). The scalar execution unit 5 selects the R1 field held in the register 508 by the selector 509 and sets it in the EL register 510. (FIG. 5 T2). The content (the number of processed elements of the OP2) of the general purpose register designated by the R1 field is read out by the EL register 510 through the path 45 and it is set in the work register A (WAR) 500 through the selector 505 (FIG. 5 T3). The content of the WAR 500 is multiplied by the number of elements (8) by an operation unit 503 and the result is set in the WAR 500 through the selector 505 (FIG. 5 T4). The content of the WAR 500 and the first four bytes (start address of the OP2) are added by the operation unit 503 and the sum is set in the work register C (WCR) 502 through the selector 507. (FIG. 5 T5). The number of processed elements read from the GPR 4 into the WAR 500 is normally zero and the product after the multiplication by the number of elements is also zero. However, when the MERGE SORT instruction is interrupted, the number of elements processed so far is held in the GPR 4. Accordingly, when the process is resumed, the number of processed elements multiplied by the number of elements is added to the start address specified by the DT to create the address of the resumed element.

The content of the WCR 502 is selected by the selector 504 and transferred to the SAA 200 in the address control unit 2 through the path 52 and the selector 206. (FIG. 5 T6). The second four bytes (maximum number of elements of the OP2) of the WBR 501 are selected by the selector 504 and transferred to the vector processor 7 through the path 57.

The next eight bytes of the DT are read out in overlap with the readout of the first eight bytes. This is shown in FIG. 5. The +8 and +16 operations of the DTO are carried out by the operation unit 204 in the address control unit 2. As shown in FIG. 5, the vector operand address at which the processing is to start is set in the SAA 200, SAB 201 and the store only address register (DAR) 202 in the address register control unit 2.

The contents of the three general purpose registers having serial numbers starting from the number specified by the R1 field of the instruction are serially read from the GPR 4 into the scalar processing unit 5 through the path 45 and sent to the vector processor 7 through the selector 504 and the path 57. The +1 and +2 operations of the R1 field are carried out by the operation unit 512.

Figure 6:
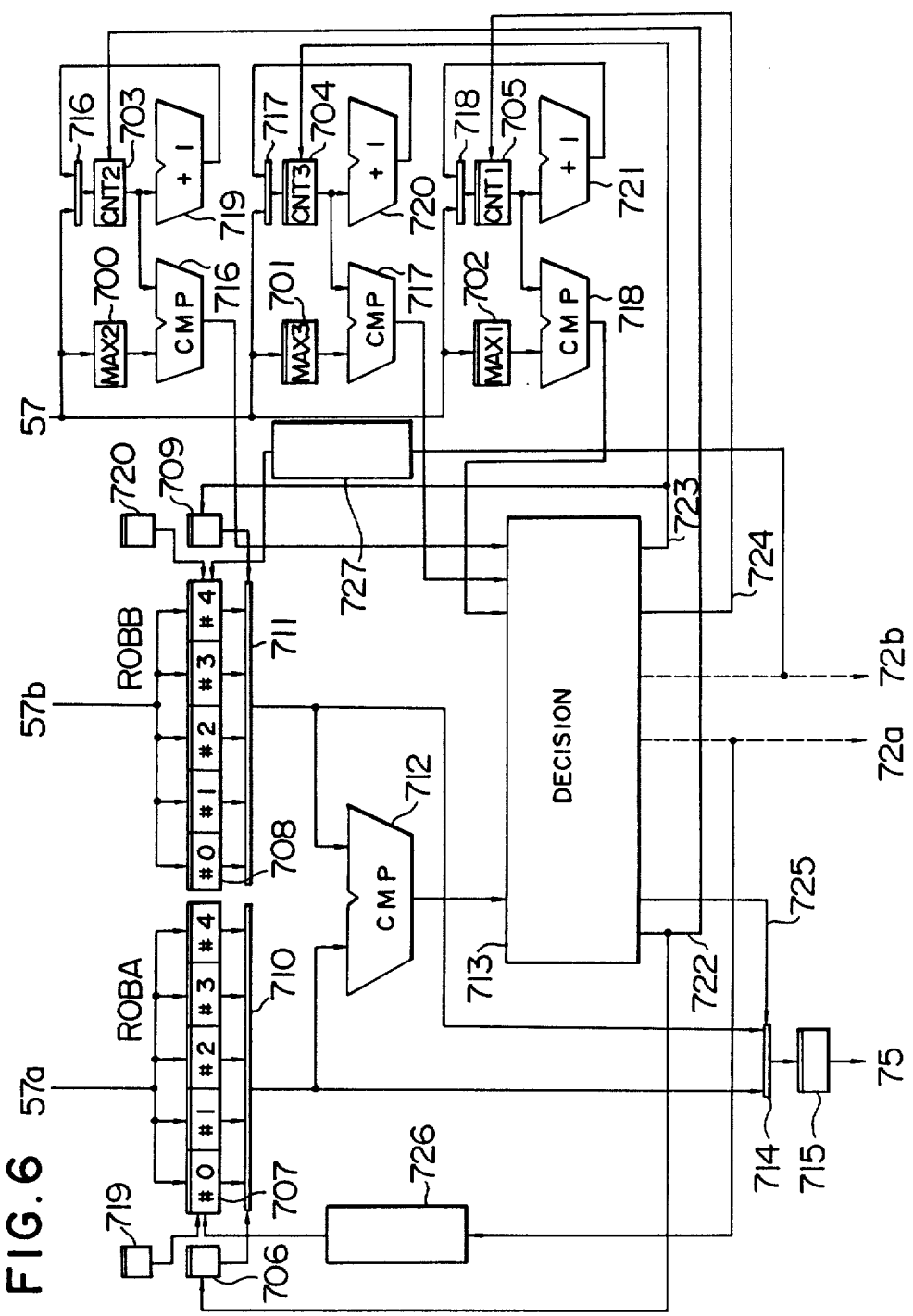
FIG. 6 is a block diagram showing a detail of a vector processor of FIG. 1.

FIG. 6 shows an internal configuration of the vector processor 7. The maximum numbers of elements of the operands sent from the scalar execution unit 5 through the path 57 are set in maximum number of elements registers MAX2 700, MAX3 701 and MAX1 702, and the numbers of processed elements of the operands are set in element counters CNT2 703, CNT3 704 and CNT1 705.

The preprocessing to start the operations for the vector elements is thus finished.

The outline of the processing of the vector elements of the MERGE SORT instruction is explained with reference to FIG. 4.

A fetch request addressed by the SAA 200 and SAB 201 is issued to the buffer storage control unit 1 from the address control unit 2 under the control of the scalar execution unit 5. The SAA 200 and SAB 201 contain the start addresses of the unprocessed elements of OP2 and OP3, respectively.

The buffer storage control unit 1 translate the content of the SAA 200 sent through the path 21a using the address translation unit (ATO) 100 and sets the translated address in the BSARO 102, and it accesses the BSO 104 by means of the translated address and sets the read data in the DRO 106. It also accesses the BS1 105 by means of the content of the SAB 201 sent through the path 21b and sets the read data in the DR1 107. As a result, the DRO 106 and DR1 107 contain the start elements of the unprocessed elements of OP2 and OP3, respectively.

The scalar execution unit 5 reads out the content of the DRO 106 through the path 15a and sets it in the WAR 500. It also reads out the content of the DR1 107 through the path 15b and sets it in the WBR 501.

The scalar execution unit 5 sends the data to the vector processor 7 through the paths 57a and 57b. When the vector processor 7 receives the vector operand data through the paths 57a and 57b, it compares the second four bytes of the data and sends the smaller data (OP2 elements if both are equal) to the scalar execution unit 5 through the path 75.

A fixed number of cycles after the scalar execution unit 5 has sent out the data to the vector processor 7, it receives the data from the vector processor 7 through the path 75 and sets it in the WCR 502.

The address control unit 2 sends a store request addressed by the DAR 202 to the buffer storage control unit 1 under the control of the scalar execution unit 5. The DAR 202 points to the start address of the unprocessed elements of OP3.

On the other hand, the data stored in the WCR 502 is set in the write data register (FR) 108 in the buffer storage control unit 1 under the instruction of the scalar execution unit 5. The buffer storage control unit 1 translates the address sent from the address control unit 2, and if the translated address is in the BSO 104 and BS1 105, it writes the content of the FR 108. It also sends the store request to the main storage 9.

In the data transfer of the vector operand data, the registers and paths other than those of the vector processor 7 utilize resources which are usually used in executing the scalar instructions. The data is transferred under the control of the scalar execution unit 5.

In the MERGE SORT instruction, the OP2 element and the OP3 element are compared and the smaller one (the OP2 element if both are equal) is selected and stored. For example, in the example shown in FIG. 2, the OP2 #0 element and the OP3 #0 element are compared, and the smaller one, the OP2 element, is selected and stored. Then, the next element of the selected operand and the previous element of the non-selected operand are compared. In the example of FIG. 2, the OP2 #1 element and the OP3 #0 element are compared.

In order to achieve the above operation, the comparison result in the vector processor must be reflected to the updating of the SAA 200 or SAB 201 in the address control unit 2. Control lines 72a and 72b which indicate which one of the OP2 and OP3 was selected in the comparison in the vector processor 7 to the address control unit 2 are provided so that the comparison result in the vector processor 7 is reflected to the updating of the address register in the address control unit 2.

In one practical method, the OP2 #0 element and the OP3 #0 element are compared, the OP2 element is selected, the SAA 200 which holds the OP2 address is incremented by 8 through the control line 72a, and the fetch request for the OP2 #1 element is sent out. In this method, however, a high speed pipeline operation is not attained.

In the present embodiment, the operand address register for the selected operand is not updated but the updating of the operand register for the non-selected operand is suppressed and the fetch request is sent out in each cycle. Namely;

(1) The vector processor 7 sets the control line 72b to "1" for one machine cycle if the OP2 is selected as a result of the comparison, and sets the control line 72a to "1" if the OP3 is selected.

(2) The address control unit 2 adds 8 to the SAA 200 by the adder 203 if the control line 72a is "0" in the cycle in which the fetch request for the OP2 is issued, and suppresses the updating if the control line 72a is "1".

(3) The address control unit 2 adds 8 to the SAB 201 by the adder 204 if the control line 72b is "0" in the cycle in which the fetch request for the OP3 is issued, and suppresses the updating if the control line 72b is "1".

(4) On the other hand, the DAR 202 is incremented by 8 by the adder 205 for each comparison because either the OP2 or the OP3 is stored each time.

In this method, since both the SAA 200 and the SAB 201 are incremented by 8 in each cycle until the comparison of the OP2 #0 element and the OP3 #0 element has been completed, the vector processor 7 needs a buffer to store necessary data. When the updating of the address register is suppressed and the fetch request is issued each cycle, the same data is read out repeatedly. By controlling the vector processor 7 such that it does nor fetch the data from the scalar execution unit 5, the fetching of unnecessary data into the operand buffer is prevented.

FIG. 6 shows an embodiment of the vector processor 7. Numeral 707 denotes an operand buffer A (ROBA) for storing the OP2 data, and numeral 708 denotes an operand buffer B (ROBB) for storing the OP3 data. The ROBA 707 and ROBB 708 can hold five elements #0-#4, respectively. They receive and hold the OP2 data and the OP3 data sent from the scalar execution unit 5 through the paths 57a and 57b, respectively. An in-pointer 719 is a 3-bit counter which is wrapped around from 4 to 0. The data sent from the path 57a is set at a data position in the ROBA 707 designated by the in-pointer 719. An in-pointer 720 is a counter which is identical in construction to the in-pointer 719. The data from the path 57b is set at a data position of the ROBB 708 designated by the in-pointer 720. When the data is set in the ROBA 707 and ROBB 708, the in-pointers 719 and 720 are incremented by one, respectively. The setting of the data into the ROBA 707 and the ROBB 708 is effected by outputs of delay circuits 726 and 727.

An out-pointer (ROPA) 706 and an out-pointer (ROPB) 709 are 3-bit counters which wrap around from 4 to 0. The outputs of the ROPA 706 and ROPB 709 are supplied to selectors 710 and 711, respectively, which read out the elements at data positions of the ROBA 707 and ROBB 708 designated by the ROPA 706 and ROPB 709, respectively. Thus, the ROBA 707 and ROBB 708 are of the FIFO (first-in first-out) type.

The element data from the selectors 710 and 711 are compared by a comparator 712. The comparison result of the comparator 712 is supplied to a decision circuit 713. The decision circuit 713 activates a selector 714 through a path 725 in accordance with the comparison result of the comparator 712 so that the smaller element data is set in a register 715.

The operation of the vector processor 7 shown in FIG. 6 is explained with reference to a time chart shown in FIG. 7. In the time chart of FIG. 7, OP2 and OP3 are data as shown in FIG. 2 and the numbers of unprocessed elements of the OP2 and OP3 are zero, respectively.

If a fetch request for the start element is issued from the address control unit 8 in the cycle 0, the data arrives at the vector processor 7 in the cycle 4. The OP2 element #0 and the OP3 element #0 are read into the DR0 and DR1, respectively in the cycle 2 at the OP2 address OP2A' and the OP3 address OP3A' designated by the SAA 200 and the SAB 201, respectively, in the cycle 0. In the cycle 3, they are transferred to the WAR and WBR, and in the cycle 4, they are set in the ROBA and ROBB, respectively. In the cycle 4, they are read from the ROBA and ROBB and compared. If the OP2 element is selected as a result of the comparison of the OP2 and OP3 elements by the comparator 712, the decision circuit 713 operates as follows.

Select the OP2 data by the selector 714 by the output 725.

Increment the ROPA 706 by one by the output 722 and set the value incremented by the adder 719 in the CNT2 703 through the selector 716.

Set the value incremented by the adder 721 in the CNT1 705 through the selector 718 by the output 724.

Suppress the updating of the SAB 201 in the next cycle by the output 72b.

Figure 7:
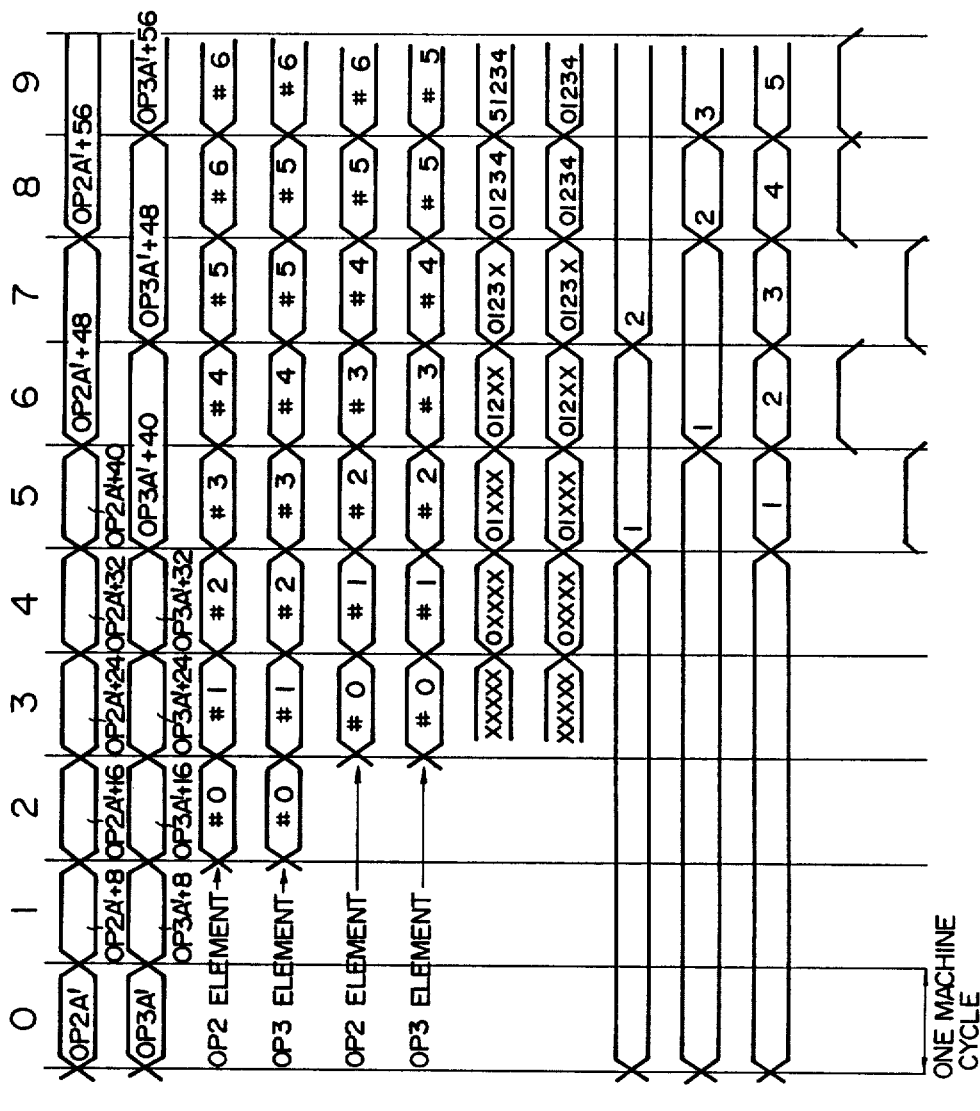
FIG. 7 is a time chart for illustrating an operation of FIG. 6.

As shown in FIG. 7, the operand data fetched by the fetch request for the element #1-#4 of the OP3 are sequentially set in the ROBB 708 until the output 72b is reflected to the updating of the address register. The fetch request for the element #5 of the OP3 is also issued and the operand data fetched thereby is set in the WBR 501 of the scalar processing unit 5 but it is not set in the ROBB 708, because the output 72b of the decision circuit 713 is supplied to the ROBB 708 through the delay 727 four cycles later to suppress the setting into the ROBB 708. Accordingly, the ROBB 708 requires a memory capacity of at least (the number of fetch requests overrun −1)×8 bytes, that is, 40 bytes. The ROBA 707 operates in a similar manner and is controlled by a 4-cycle delay 726.

In the cycle 5, the ROPA 706 is incremented by one and the ROPB 709 is not updated. Thus, the element #1 of the OP2 and the element #0 of the OP3 are next compared. As a result, the following operation takes place.

Select the OP3 data by the selector 714 by the output 725.

Increment the ROPB 709 by one by the output 723, and set the value incremented by one by the adder 720 in the CNT3 704 through the selector 717.

Set the value incremented by one by the adder 721 in the CNT1 705 through the selector 718 by the output 724.

Suppress the updating of the SAA 200 in the next cycle by the output 72a.

The operation continues as shown in FIG. 7. The ROPA 706 and ROPB 709 which instruct the elements to be next processed after being fetched from the buffers 707 and 708 are not uniformly incremented each cycle but are controlled in accordance with the comparison result of the comparator 712. Similarly, the updating of the element counters 703 and 704 is controlled.

As described above, by providing a sufficient capacity in the operand buffer for each operand and comparing the operands and reflecting the comparison result to the operand buffer out-pointer and the element counter in one machine cycle, the MERG SORT instruction can be processed at one machine cycle pitch.

The operation of the MERGE SORT instruction after the element-by-element compare operation is explained with FIGS. 6 and 4.

Referring first to FIG. 6, the detection of the end of operation is explained. The outputs of the comparators 716, 717 and 718 are supplied to the decision circuit 713. The element counters CNT2 703, CNT3 704 and CNT1 705 are counted up as shown in FIG. 7. If the comparison of the CNT2 703 of the OP2 and the MAX2 700 of the OP2 by the comparator 716 shows they are equal and the comparison of the CNT3 704 of the OP3 and the MAX3 701 of the OP3 by the comparator 717 shows they are equal, the absence of an effective element is indicated to the scalar execution unit 5 through the line 72c in synchronism with the sending of the store request from the WCR 502 of the last element. As a result, the scalar execution unit 5 stops sending the data stored in the WCR 502 and starts the end processing. In the end processing, the contents of the counters CNT2 703, CNT3 704 and CNT1 705 for the respective operands in the vector processor 7 are sequentially read out through the selector 714 under the control of the scalar execution unit 5, set in the WCR 502 through the path 75, sent to the GPR 4 through the path 54 and written into three general purpose registers having serial numbers starting from the number specified by the R1 field of the instruction. After all counts have been written into the three general purpose registers, the execution unit 5 indicated the end of the MERGE SORT instruction to the instruction unit 5.

Figure 8:
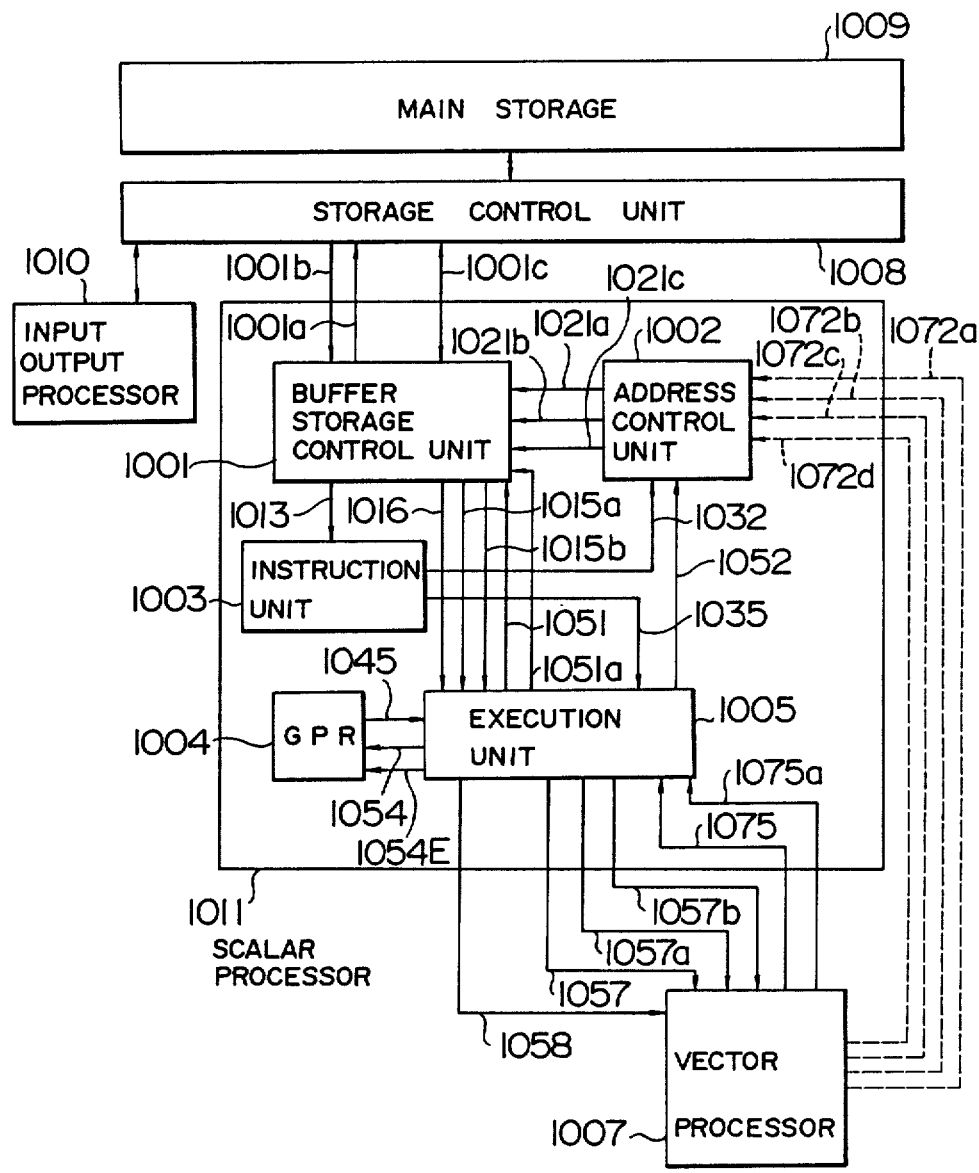
FIG. 8 is a block diagram of another embodiment of the present invention.

FIG. 8 shows another embodiment of the present invention. The configuration of FIG. 8 is similar to that of FIG. 1. Numeral 1011 denotes a scalar processor which comprises a buffer storage control unit 1001, an address control unit 1002, an instruction unit 1003, general purpose registers (GPR) 1004 and an execution control unit 1005. The scalar processor 1011 reads and writes data from and to a main storage 1009 through a storage control unit 1008 together with an input/output processor 1010. A vector processor 1007 is connected to the execution control unit 1005 of the scalar processor 1011. The vector processor 1007 performs a new type of vector operation in which an element number to be processed is determined by an operation result of the previous vector elements.

Prior to the explanation of the vector operation of FIG. 8, a MERGE JOIN instruction which is one of the instructions to perform the vector operation is explained.

Figure 9:
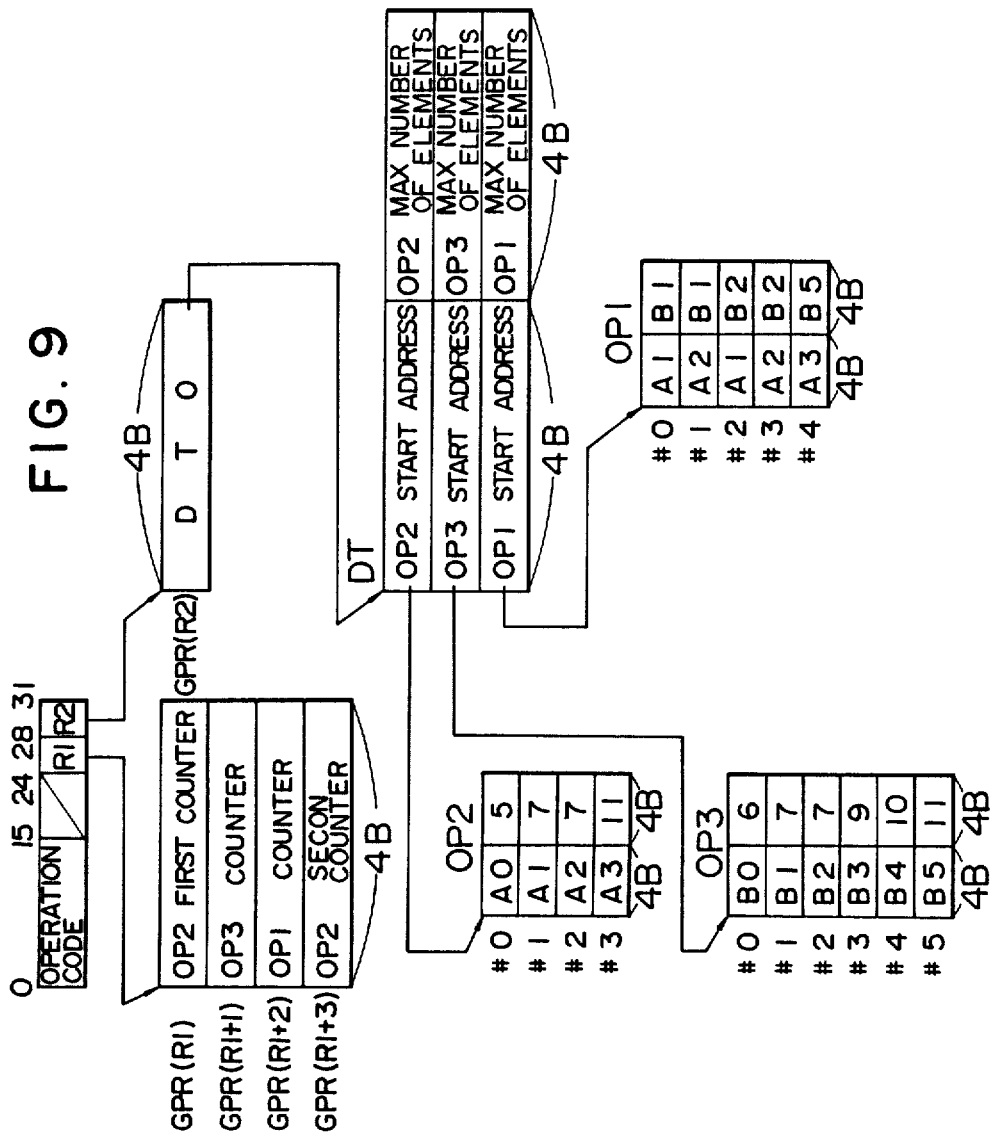
FIG. 9 shows a MERGE JOIN instruction format and an operation of the instruction.

FIG. 9 shows a format of the MERGE JOIN instruction and the operation thereof. The MERGE JOIN instruction has a 4-byte length and the format thereof is identical to that of the MERGE SORT instruction. The bits 16–23 of the instruction have no meaning. The general purpose registers having four serial numbers starting from the number specified by the bits 24–27 (R1 field) of the instruction designates a primary element counter of a second operand (OP2 first counter), an element counter of a third operand (OP3 counter), an element counter of a first operand (OP1 counter) and a secondary element counter of the second operand (OP2 second counter). Two counters are required for the second operand to enable back tracking. The general purpose register specified by the bit 28–31 (R2 field) designates a description table origin (DTO) which is a start address of a description table (DT). The DT is in the main storage 1009 and contains the start address of the vector operand and the maximum number of elements. The vector operand indirectly specified by the DT is a dual vector data in which the first four bytes contain an integer without a sign to identify the data and the second four bytes contain the data to be compared. In a simple example, the first four bytes contain a name code and the second four bytes contain his or her payroll. In another example, the first four bytes contain a mechanical part code and the second four bytes contains a price thereof. In FIG. 9, the MERGE JOIN instruction is used with:

maximum number of elements of OP2=4 maximum number of elements of OP3=6 maximum number of elements of OP1=5

In FIG. 9, "#" represents the element number. The first four bytes of the vector data are called a front part and the second four bytes are called a rear part. The vector having the two parts, front part and rear part, is called a dual vector.

The MERGE JOIN instruction compares the rear parts of the two dual vectors for the OP2 and OP3 having the rear parts thereof sorted, and if they are equal, extracts the front parts of the respective dual vectors to produce a new dual vector (OP1). The MERGE JOIN instruction is effective in the table join processing in the relational data base.

Figure 10:
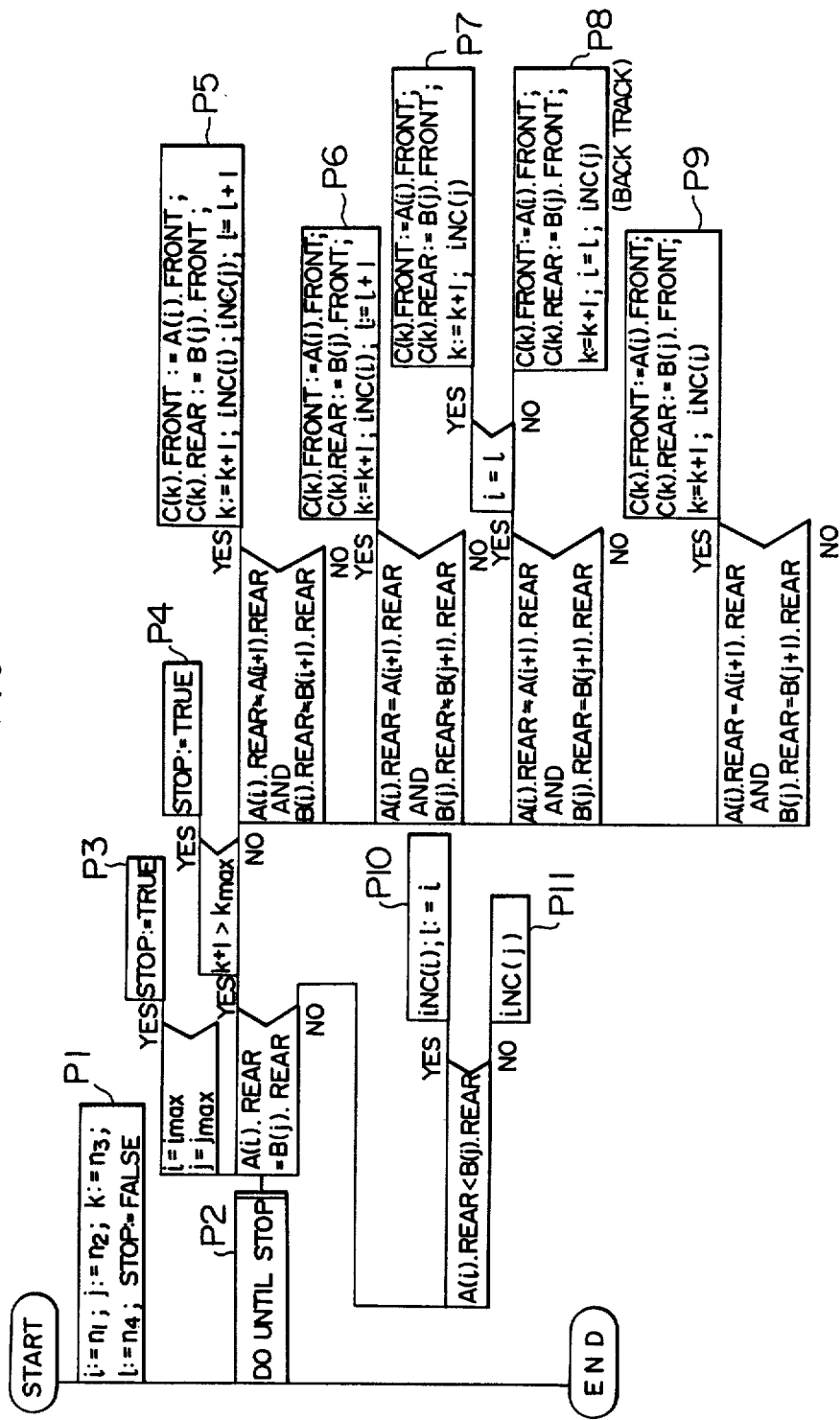
FIG. 10 is a program analysis diagram for illustrating the operation of the MERGE JOIN instruction.

FIG. 10 is a program analysis diagram which illustrates the operation of the MERGE JOIN instruction. In FIG. 10, $n_1$, $n_2$, $n_3$ and $n_4$ represent initial values of the element counters which hold the element numbers, and they are integers. The element counters are used for the same purpose as in the previous embodiment, that is, for the number of processed elements.

It is assumed that $0 \le n_1 \le i_{max}$, $0 \le n_2 \le j_{max}$, $0 \le n_3 \le k_{max}$ and $0 \le n_4 \le i_{max}$, where $i_{max}$, $j_{max}$ and $k_{max}$ are maximum element numbers which define the end condition of the vector operation, and INC is a function which meets the following condition.

$$INC(i) = \begin{cases} i & \text{if } i = i_{max} \\ i + 1 & \text{if } i \ne i_{max} \end{cases}$$

$$INC(j) = \begin{cases} j & \text{if } j = j_{max} \\ j + 1 & \text{if } j \ne j_{max} \end{cases}$$

If $i=i_{max}$, $A(i).REAR = A(i+1).REAR$ is false, and $A(i).REAR \ne A(i+1).REAR$ is true. Same is true when $j=j_{max}$.

The correspondence between FIGS. 9 and 10 is shown below.

First four bytes of OP2 ←→ A(i).FRONT;
Second four bytes of OP2 ←→ A(i).REAR
First four bytes of OP3 ←→ B(i).FRONT;
Second four bytes of OP3 ←→ B(i).REAR
First four bytes of OP1 ←→ C(i).FRONT;
Second four bytes of OP1 ←→ C(i).REAR
Maximum number of elements of OP2 ←→ $i_{max}$
Maximum number of elements of OP3 ←→ $j_{max}$
Maximum number of elements of OP1 ←→ $k_{max}$ The MERGE JOIN instruction is also a vector instruction of a type in which the increment of i and j depends on the comparison result of the rear parts of A(i) and B(j).

The operation to execute the MERGE JOIN instruction is now explained.

In FIG. 8, the instruction fetched from the buffer storage control unit 1001 through the path 1013 is decoded by the instruction unit 1003. If it is decoded as the MERGE JOIN instruction, the instruction unit 1003 informs the execution unit 1005 through the path 1035 that it is the MERGE JOIN instruction and sends the register numbers (R1 and R2 fields) to be used to the execution unit 1005, which sends the register numbers of the R1 and R2 fields sent from the instruction unit 1003 to the GPR 1004 through the path 1054 to read out the content of the GPR 1004 through the path 1045.

Figure 11:
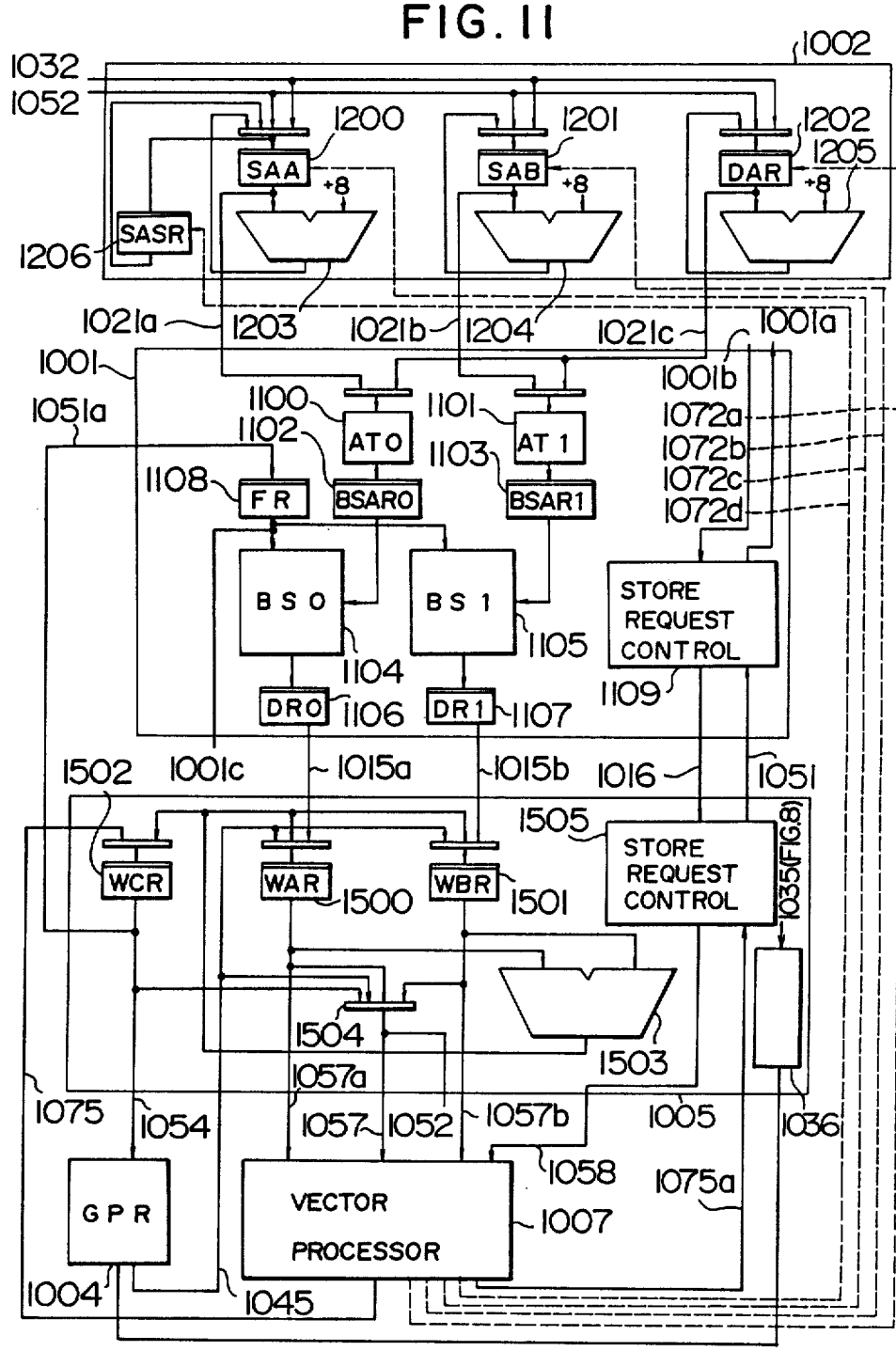
FIG. 11 is a block diagram showing a detail of FIG. 8.

FIG. 11 shows a detail of the buffer storage control unit 1001, address control unit 1002 and execution unit 1005 of FIG. 8. In FIG. 11, the path 1035 is connected to a control circuit 1036 which comprises the registers 508 and 510, selector 509 and operation unit 512 shown in FIG. 4. The control circuit 1036 sends the register number in the R2 field to the GPR 1004 through the path 1054E. The DTO sent from the GPR 1004 through the path 1045 is set in a work register (WBR) 1501 in the execution unit 1005. The content (OP2 first counter) of the GPR 1004 specified by the R1 field of the MERGE JOIN instruction is set in a work register (WAR) 1500. The DTO set in the WAR 1501 is set in a fetch-only address register (SAB) 1201 in the address control unit 1002 through the path 1052. The content DTO of the SAB 1201 is sent to the buffer storage control unit 1001 through a path 1021b. The DTO is translated by an address translation unit (AT1) 1101 from a virtual address to a real address, and the translated real address is set in a buffer address register (BSAR 1) 1103. A buffer storage (BS1) 1105 is accessed by the content (DTO) of the BSAR1 1103 and the read data is set in an 8-byte data register (DR1) 1107. As a result, the first four bytes of the DR1 1107 contain the OP2 start address and the second four bytes contains the maximum number of elements of the OP2. The data of the DR1 1107 is sent to the execution unit 1005 through the path 1015b.

The buffer storage control unit 1001 includes address translation unit AT0 1100, buffer storage address register BSAR0 1102, buffer storage BS0 1104 and data register DR0 1106 which are functionally identical to the AT1 1101, BSAR1 1103, BS1 1105 and DR1 1107, as the previous embodiment does. The BS0 1104 and BS1 1105 are high speed memories for storing partial copies of the main storage 1009. If the data to be accessed is not contained in the BS0 or BS1, it is transferred from the main storage 1009 under the control of the buffer storage control unit 1001.

The execution unit 1005 sets the data sent through the path 1015b in the WBR 1501, adds the content of the general purpose register specified by the R1 field set in the WAR 1500, multiplied by the length of the element (that is, 8) to the first four bytes (OP2 start address) of the WBR 1501 by an adder 1503, and sets the resulting sum in a work address register (WCR) 1502. The content of the WCR 1502 is selected by a selector 1504 and transferred to a fetch-only address register (SAA) 1200 in the address control unit 1002 through a path 1052. The second four bytes (maximum number of elements of the OP2) of the WBR 1501 are transferred the vector processor 1007 through a path 1057.

Figure 12:
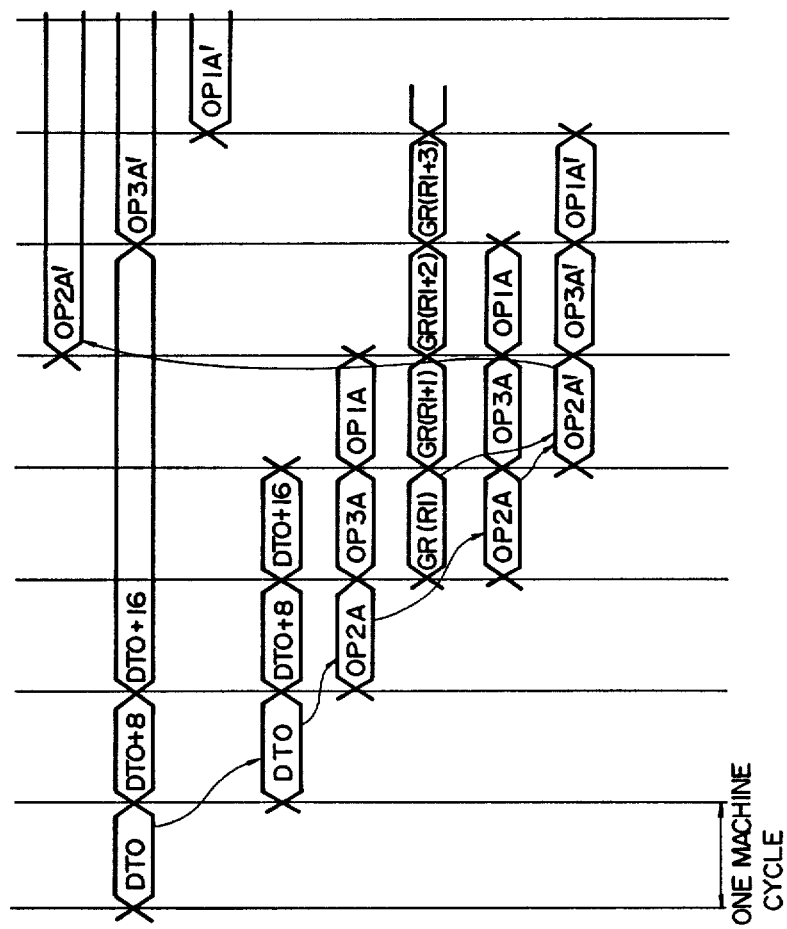
FIG. 12 is a time chart for illustrating an operation of FIG. 11.

The next eight bytes of the DT shown in FIG. are then read out in a similar manner. They are read in overlapping relationship with the readout of the first eight bytes. This is illustrated in FIG. 12, in which:

OP2A represents the OP2 start address,
OP3A represents the OP3 start address,
OP1A represents the OP1 start address,
GR(R1) represents the OP2 first counter content,
GR(R1+1) represents the OP3 counter content,
GR(R1+2) represents the OP1 counter content,
GR(R1+3) represents the OP2 second counter content,
OP2A' represents the start address of the OP2 unprocessed elements,
OP3A' represents the start address of the OP3 unprocessed elements, and
OP1A' represents the start address of the OP1 unprocessed elements As shown in FIG. 12, the vector operands to start the first processing are set in the SAA 1200, SAB 1201 and DAR 1202 in the address register control unit 1002. The contents of four general purpose registers having serial numbers starting from the number specified by the R1 field of the instruction are sequentially read into the execution unit 1005 through the path 1045 and sent to the processor 1007 through the selector 1504 and the path 1057.

Figure 13:
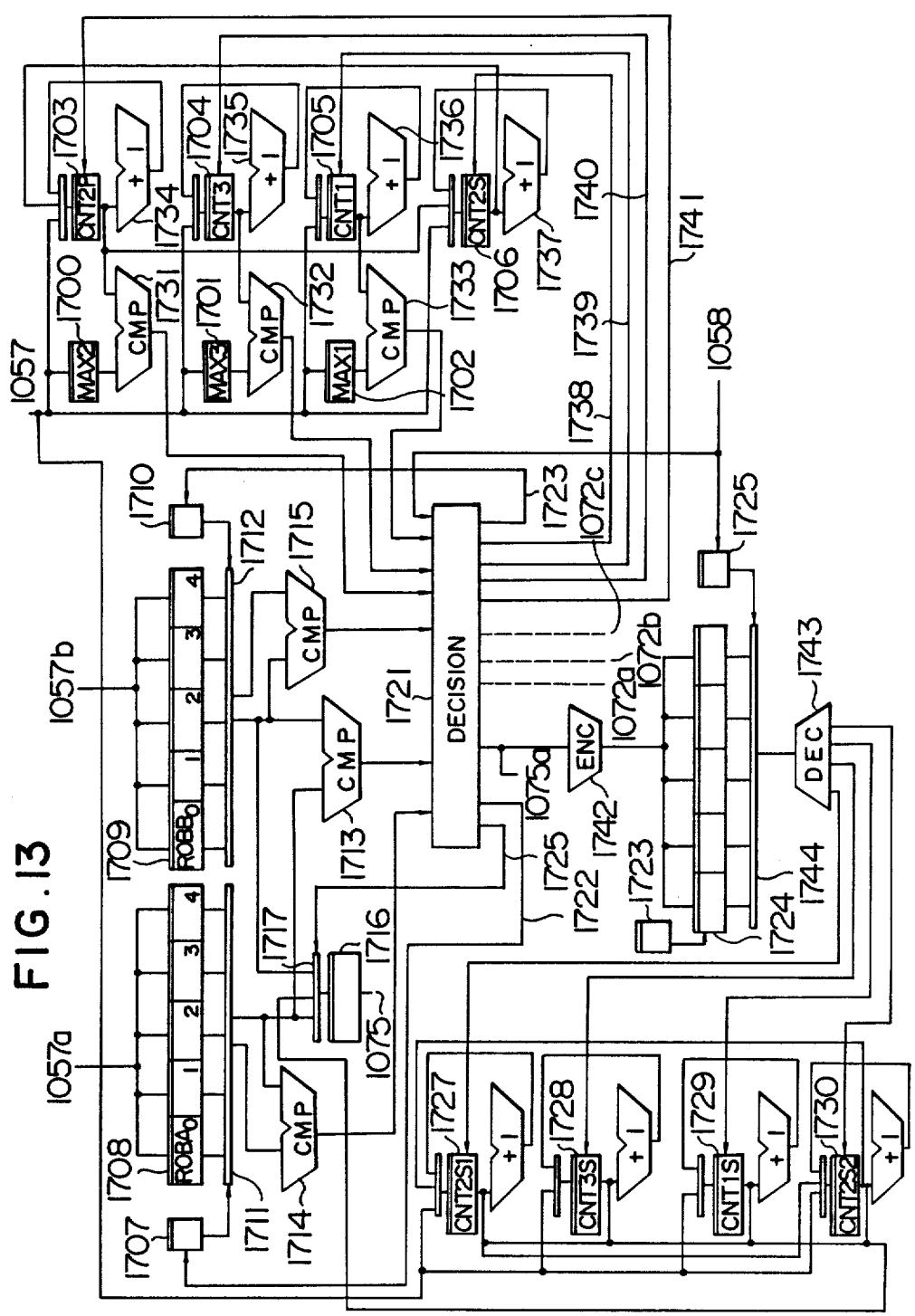
FIG. 13 is a block diagram showing a detail of a vector processor of FIG. 8.

FIG. 13 shows an internal configuration of the vector processor 1007. The maximum numbers of elements of the operands sent from the execution unit 1005 through the path 1057 are set in maximum number of element registers MAX2 1700, MAX3 1701 and MAX1 1702, and the counts of the operands are set in the element counters CNT2P 1703, CNT3 1704, CNT1 1705 and CNT2S 1706 which determine the end, and in CNT2S1 1727, CNT3S 1728, CNT1S 1729 and CNT2S2 1730 which count the numbers of processed elements.

So far, the pre-processing to start the operation of the vector elements has been completed.

The outline of the processing of the vector elements by the MERGE JOIN instruction is explained with reference to FIG. 11.

A fetch request addressed by the SAA 1200 and SAB 1201 is issued to the buffer storage control unit 1001 from the address control unit 1002. The SAA 1200 and SAB 1201 contain the start address of the OP2 unprocessed elements and the start address of the OP3 unprocessed elements. The buffer storage control unit 1001 translates the content of the SAA 1200 sent through the path 1021a by the ATO 1100, sets the translated address in the BSAR 1102, accesses the BS0 1104 by that address and sets the read data in the DR0 1106. It also accesses the BS1 1105 by the content of the SAB 1201 sent through the path 1021b and sets the read data in the DR1 1107. As a result, DR0 1106 contains the start element of the OP2 unprocessed elements and the DR1 1107 contains the start element of the OP3 unprocessed elements.

Because the ATO 1100, BSAR0 1102, BS0 1104, DR0 1106, and AT1 1101, BSAR1 1103, BS1 1105, DR1 1107 of the buffer storage control unit 1001 are operable in parallel, the compare operation in the vector processor 1007 is not delayed and the data can be supplied without delay.

The execution unit 1005 reads out the content of the DR0 1106 through the path 1015a and sets it in the WAR 1500. It also reads out the content of the DR1 1107 through the path 1015b and sets it in the WBR 1501. Then, the execution unit 1005 instructs the vector processor 1007 to fetch the data through the paths 1057a and 1057b.

When the vector processor 1007 receives the vector operand data sent through the paths 1057a and 1057b, it starts to compare the rear parts (second four bytes) of the operands, and if the rear parts of the OP2 and OP3 are equal, it combines front parts of the operands into an 8-byte data and sends to the execution unit 1005 a compare result signal through the path 1075a and the stored data through the path 1075.

When the execution unit 1005 receives the compare result signal indicating that the rear parts of the OP2 and OP3 are equal through the path 1075a, it sends a store request to the store request control circuit 1109 of the buffer storage control unit 1001 through the store request control circuit 1505 and the path 1051. It also sets the stored data sent from the vector processor 1007 through the path 1075 in the FR 1108 of the buffer storage control unit 1001 through the WCR 1502 and the path 1051a. It further sends the store address in the store address register (DAR) 1202 of the address control unit 1002 to the buffer storage control unit 1001. The DAR 1202 now points to the start address of the OP1 unprocessed elements. The buffer storage control unit 1001 translates the address sent from the address control unit 1002, and if the translated address is in the BS0 1104 or BS1 1105, it writes the content of the FR 1108 into the corresponding BS. It also sends the store request to the main storage control unit 1008 through the path 1001a and sends the store data through the path 1001c to write it into the main storage 1009. After the storage of the data into the main storage 1009, an end of store signal is sent from the main storage control unit 1008 to the buffer storage control unit 1001 through the path 1001b.

On the other hand, if the rear parts of the OP2 and OP3 are not equal, the store request control circuit 1505 of the execution unit 1005 responds to the compare result signal sent from the vector processor 1007 through the path 1075a to add an "invalid" additional information to the tore request and sends it to the buffer storage control unit 1001 through the path 1051. When the rear parts of the OP2 and OP3 are not equal, the vector processor 1007 sends a suppress signal for the updating of the store address to the address control unit 1002 through the path 1072a.

In a virtual storage scheme computer, desired data is not always present in the main storage but it may be swept out to an auxiliary storage. Accordingly, during the course of the processing of the vector operation, it may be necessary to interrupt the processing by a page translation exception. In accordance with the present invention, when such an interruption is required, the count corresponding to the processed element can be written back to the GPR 1004 because the operand counters corresponding to the elements which have been stored into the main storage are provided. After the interruption operation, the instruction is restarted and the count is read out from the GPR 1004 to resume the processing. Such a function is effective in specifying the exceptional element number in the vector operation which causes the data exception or operation exception in the execution. When the operation exception takes places, the counter which is used to compare the processing element number with the initially set maximum element number may overrun, and in the vector operation, the processing element number does not always increase in a fixed cycle on all operands. Accordingly, the correct number of elements cannot be determined by subtracting a fixed number from the counters CNT2P 1703, CNT3 1704, CNT1 1705 and CNT2S 1706 of FIG. 13. Since the counters CNT2S1 1727, CNT3S 1728, CNT1S 1729 and CNT2S2 1730 which count the numbers of processed elements are counted up late (more specifically, after the determination of the presence or absence of the exception), if the exception is detected, the counting up can be suppressed and the element members of the normally processed elements can be held.

FIG. 13 shows a configuration of the vector processor 1007 for processing the vector elements of the MERGE JOIN instruction.

In the vector processor of FIG. 13, ROBA 1708 is an operand buffer for storing the OP2 data, ROPA 1707 is an out-pointer for the ROBA 1708, ROBB 1709 is an operand buffer for storing the OP3 data and ROPB 1710 is an out-pointer for the ROBB 1709. In FIG. 13, in-pointers for the operand buffers 1708 and 1709 are omitted although similar in-pointers to the in-pointers 719 and 720 in FIG. 6 are provided.

Numeral 1713 denotes a comparator for comparing the second four bytes of the operand data, numeral 1714 denotes a comparator for comparing the element designated by the OP2 counter CNT2P 1703 and the next element, and numeral 1715 denotes a comparator for comparing the element designated by the OP3 counter CNT3 1704 and the next element. When the rear parts (second four bytes of the data) of the OP2 and OP3 are equal, a register 1716 combines the front parts (first four bytes of the data) of the OP2 and OP3 into an 8-byte data by the control signal from a path 1725 and a selector 1717 and sends the 8-byte data to the execution unit 1005 through the path 1075, and reads out the contents of the counter CNT2S1 1727, CNT3S 1728, CNT1S 1729 and CNT2S2 1730 and writes them into the GPR 1004 through the paths 1075 and 1054 (FIG. 11). A decision circuit 1721 receives the compare result of the rear part of the OP2 and OP3 and the compare result of the counters CNT2P 1703, CNT3 1704 and CNT1 1705 and the registers MAX2 1700, MAX3 1701 and MAX1 1702 to determine whether it is an end or not and which counter is to be incremented. The decision of the decision circuit 1721 is set in a decision queue register 1724 through an encoder 1742. A set position and an output position of the decision queue register 1724 are pointed to by an in-pointer 1723 and an out-pointer 1725. The output of the queue register 1724 is supplied to a decoder 1743 through a selector 1744. The output of the decoder 1743 controls counters 1727–1730.

When a fetch request is issued from the execution unit 1005 to the buffer storage control unit 1001 and the OP2 and OP3 are fetched, the fetched data of the OP2 is set in the ROBA 1708 through the path 1015a of FIG. 11, the WAR 1500 and the path 1057a. The data of the OP3 is set in the ROBB 1709 through the path 1015b, the WAR 1501 and the path 1057b. Then, they are compared. The decision of the decision circuit 1721 is encoded by the encoder 1742 and the encoded data is set in the decision queue register 1724 at a position pointed by the in-pointer 1723. The decision is also sent to the execution unit 1005 through the path 1075a.

The execution unit 1005 adds valid or invalid information to the store request by the store control circuit 1505 and sends the store request to the store request control circuit 1109 in the buffer storage control unit 1001. Whether the additional information indicates valid or invalid, the store request control circuit 1109 sets the store request in a first-in first out queue. If no store request is being processed by the main storage control unit 1008 or if the end of processing of the previous store request is indicated to the store request control circuit 1109 through the path 1001b, the store request control circuit 1109 reads out the store request and the additional information from the queue in the first-in first out scheme. If the additional information indicates that the store request is valid, the store request control circuit 1109 sends the store request to the main storage control unit 1008. If it indicates invalid, the end of store request processing signal is sent to the execution unit 1005 through the path 1016. If the store request is valid and the store request is issued to the main storage control unit 1008, the store request control circuit 1109 suspends the fetching of the next request from the queue until the end of store is indicated through the path 1001*b* to prevent the overrun of the processing. The presence or absence of the store access exception detected by the buffer storage control unit 1001 is also sent to the execution unit 1005 through the path 1016 together with the end of store request processing signal. The store request control circuit 1505 in the execution unit 1005 sends the end of store request processing signal sent from the buffer storage control unit 1001, to the vector processor 1007 through the path 1058.

When the end of store request processing signal and the access exception signal are sent from the execution unit 1005 through the path 1058, the decision circuit in the vector processor 1007 detects the presence or absence of the access exception, and if it is absent, it increments the out-pointer 1725 of the decision queue register 1724 by one, and takes out one of the decisions held in the queue 1724. It is decoded by a decoder 1743 and an operation designated by the decoded content (increment the corresponding counter by one, copy the content of the CNT2 1727 into the CNT2S2 1730, or suppress the updating of the counter) is carried out. If the decision taken out indicates the end of processing, the counters CNT2S1 1727, CNT3S 1728, CNT1S 1729 and CNT2S2 1730 are not adapted. If the end of store request processing signal accompanied by the access exception is taken out, the counters are not updated and the access exception processing is delegated to the execution unit 1005.

In this manner, the correctly processed element numbers are held in the counters CNT2S1 1727, CNT3S 1728, CNT1S 1729 and CNT2S2 1730.

If the decision circuit 1271 detects the occurrence of "back-track" (which will be explained later), the vector processor 1007 sends a set signal for the SAA 1200 of the fetch address same register (SASR) 1206, to the address control unit 1002 through the path 1072C. A set signal for setting the content of the CNT2S 1706 to the CNT2P 1703 is also sent from the decision circuit 1721 through the path 1741. The occurrence of back-track is indicated to the execution unit 1005 through the path 1075*a*.

When the execution unit 1005 is informed of the occurrence of back-track by the vector processor 1007, it sends the fetch request addressed by the SAA 1200 having the content of the SASR 1206 set therein, to the buffer storage control unit 1001. The vector processor 1007 withholds the decision until the fetch data by the request arrives. The updating of the counters CNT2P 1703, CNT3 1704, CNT1 1705 and CNT2S 1706 is suppressed but the updating of the counters CNT2S1 1727, CNT3S 1728, CNT1S 1729 and CNT2S2 1730 by the end of store request processing signal sent through the path 1058 is effected in a normal way.

Figure 14:
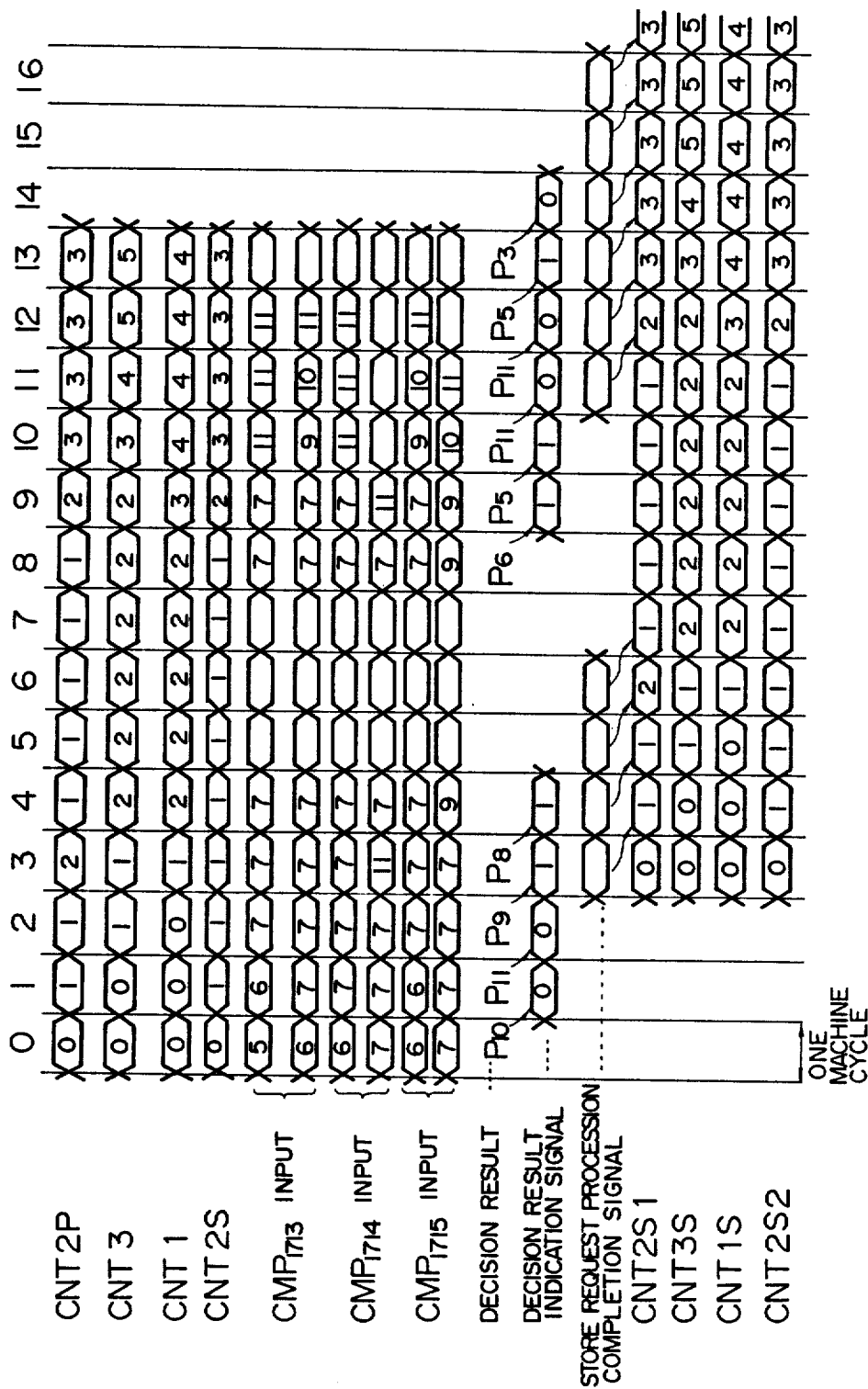
FIG. 14 is a time chart for illustrating an operation of FIG. 13.

FIG. 14 shows a time chart which illustrates the execution of the MERGE JOIN instruction in the vector processor 1007. In FIG. 14, it is assumed that the OP2 and OP3 are as shown in FIG. 9 and the start element numbers of the unprocessed elements of the OP2 and OP3 are "0", respectively. It is also assumed that the input data for the MERGE JOIN instruction has been sorted with respect to their rear parts and the fetch data of the operands arrive at the buffers 1708 and 1709 in the vector processor in the cycle 0 to be ready for comparison.

In FIG. 14, the elements #0 of the OP2 and OP3 are compared by the comparator 1713 in the cycle 0. This corresponds to P10 in FIG. 10. Because (rear part of OP2)<(rear part of OP3), the decision circuit instructs the following operations in the cycle 1.

(1) Increment the ROPA 1707, CNT2P 1703 and CNT2S 1706 by one by the outputs 1722, 1741 and 1738, respectively.

(2) Suppress the updating of the DAR 1202 and SAB 1201 in the next cycle by the outputs 1072*a* and 1072*b*, respectively.

Thus, in the next cycle 1, the element #1 of the OP2 and the element #0 of the OP3 are compared. This corresponds to P11 in FIG. 10. Since (rear part of OP2)>(rear part of OP3), the decision circuit 1721 instructs the following operations in the cycle 2.

(1) Increment the ROPB 1710 and CNT3 by one by the outputs 1723 and 1740, respectively.

(2) Suppress the updating of the DAR 1202 and SAA 1200 in the next cycle by the outputs 1072*a* and 1072*b*, respectively.

Thus, in the cycle 2, the element #1 of the OP2 and the element #1 of the OP3 are compared. This corresponds to P9 in FIG. 10. Since (rear part of OP2)=(rear part of OP3), the comparator 1714 compares A(i).REAR and A(i+1).REAR, and B(i).REAR and B(i+1).REAR. The decision circuit 1721 instructs the following operations in the cycle 2.

(1) Increment the ROPA 1707 and CNT2P 1703 by one by the outputs 1722 and 1741, respectively.

(2) Selects the front parts of the OP2 and OP3 by the selector 1717 by the output 1725.

(3) Increment the CNT1 1705 by one by the output 1739.

In the cycle 3, the action corresponding to P8 in FIG. 10 takes place. That is;

(1) Instruct setting of the content of the CNT2S 1706 into the CNT2P 1703 by the output 1741

(2) Instruct setting of the content of the SASR 1206 into the SAA 1200 by the output 1072C.

(3) Select the front part of the element #1 of the OP2 and the element #1 of the OP3 by the selector 1717 by the output 1725.

(4) Increment the CNT1 1705 by one by the output 1739.

In this manner, the address and the count are returned to the saved previous values. This is an example of the back-track.

In the present example, they are returned to the immediately previous element address and element number. In certain cases, they may return by more than one element. Thus, if the execution unit 1005 is informed of the occurrence of a back-track from the vector processor 1007 through the path 1075*a*, it reissues a fetch request. In this case, the address held in the SAA 1200 having the content of the SASR 1206 set therein is used. The cycles 5–7 of FIG. 14 show waiting for the arrival of data for the fetch request.

In FIG. 14, symbols shown in the line of decision result correspond to the PAD in FIG. 10 and indicate the operations instructed in accordance with the decision. The instruction is reflected to the contents of counters in the next cycle.

The processing after the compare operation of the elements of the MERGE JOIN instruction is explained with reference to FIGS. 11 and 13.

If the OP1 store condition is not (that is, the rear parts of the OP2 and OP3 are equal) when the contents of the counter CNT2P 1703 in the vector processor 1007 is equal to the contents of the MAX2 1700 and the contents of the counter CNT3 1704 is equal to the contents of the MAX3 1701, or the contents of the CNT1 1705 and the contents of the MAX1 1702 are equal, or if the occurrence of an exception is indicated to the decision circuit, an end of processing condition is met and the decision circuit 1721 issues an instruction to end the processing. When the execution unit 1005 receives the end of processing instruction, it waits for the clearing of the processing for the store request in the buffer storage control unit 1001, that is, the send-out of all of the end of store request processing signals for the store request to the vector processor 1007. When all of the end of store request processing signals have been sent to the vector processor 1007, the counters CNT2S1 1727, CNT3S 1728, CNT1S 1729 and CNT2S2 1730 in the vector processor 1007 holds the element numbers corresponding to the processed elements. Thereafter, the counters CNT2S1 1727, CNT3S 1728, CNT1S 1729 and CNT2S2 1730 in the vector processor 1007 are sequentially read under the control of the execution unit 1005 and their contents are set in the WCR 1502 through the selector 1717, register 1716 and path 1075, and written into four general purpose registers having serial numbers starting from the number designated by the R1 field of the instruction, through the path 1054. After the four counts have been written into the general purpose registers, the execution unit 1005 informs the instruction unit 1003 of the end of the MERGE JOIN instruction.

The post-processing for an interruption such as a page translation exception occurring during the processing of the vector elements is similar to the post-processing described above. As a result, the counters are updated for the normally processed elements, and the counts for the unprocessed elements are held in the GPR. When the instruction is restarted after the processing of the interruption, the execution of the vector instruction can be resumed by carrying out the same pre-processing to start vector processing as that of the first time.

We claim:

1. A vector processing apparatus comprising:
memory means for storing a plurality of vector operands comprising different numbers of elements;
indicating means for indicating a start address in said memory means and a maximum number of elements for each of a plurality of vector operands in response to an instruction;
address means for controlling fetching of the elements of each of the vector operands from said memory means in accordance with the start addresses supplied from said indicating means;
vector processing means for processing the elements of the vector operands fetched from said memory means and for determining the element to be next processed in accordance with an operation result of said processing of the elements;
said vector processing means including buffer means for storing the elements of the vector operands fetched from said memory means, control means for controlling the fetching of an element to be next processed from said buffer means in accordance with said operation result, and a plurality of element count means for counting the number of elements of each of the vector operands processed by said vector processing means, each of said element count means being updated by said control means in accordance with said operation result;
said control means including means for determining the end of processing based on the maximum numbers of elements of each of the vector operands indicated by said indicating means and the count of each element count means.

2. A vector processing apparatus comprising:
memory means for storing a plurality of vector operands comprising different numbers of elements;
indicating means for indicating a start address in said memory means and a maximum number of elements for each of a plurality of vector operands in response to an instruction;
address means for controlling fetching of the elements of each of the vector operands from said memory means in accordance with the start addresses supplied from said indicating means;
vector processing means for processing the elements of the vector operands fetched from said memory means and for determining the element to be next processed in accordance with an operation result of said processing of the elements;
said vector processing means including buffer means for storing the elements of the vector operands fetched from said memory means, control means for controlling the fetching of an element to be next processed from said buffer means in accordance with said operation result, and a plurality of element count means for counting the number of elements of each of the vector operands processed by said vector processing means, each of said element count means being updated by said control means in accordance with said operation result;
said control means including means for determining the end of processing based on the maximum numbers of elements of each of the vector operands indicated by said indicating means and the count of each element count means;
each of the elements of the vector operands comprising a first part representing numeric data and a second part identifying said numeric data; and
wherein said vector processing means further includes first compare means for comparing the elements of two vector operands, second compare means for comparing adjacent elements of the same operand, and means connected to said first and second compare means for combining the identification information of the elements having the same numeric data to form vector elements of combined identification information in accordance with the results of comparisons performed by said first and second compare means and for transferring the combined information to said memory means.

3. A vector processing apparatus comprising:
memory means for storing a plurality of vector operands comprising different numbers of elements;
indicating means for indicating a start address in said memory means and a maximum number of elements for each of a plurality of vector operands in response to an instruction;
address means for controlling fetching of the elements of each of the vector operands from said memory means in accordance with the start addresses supplied from said indicating means;
vector processing means for processing the elements of the vector operands fetched from said memory means and for determining the element to be next processed in accordance with an operation result of said processing of the elements;

said vector processing means including buffer means for storing the elements of the vector operands fetched from said memory means, control means for controlling the fetching of an element to be next processed from said buffer means in accordance with said operation result, and a plurality of element count means for counting the number of elements of each of the vector operands processed by said vector processing means, each of said element count means being updated by said control means in accordance with said operation result;

said control means including means for determining the end of processing based on the maximum numbers of elements of each of the vector operands indicated by said indicating means and the count of each element count means;

said address means including a plurality of address register means for holding a start address of each of the vector operands indicated by said indicating means and providing said memory means with an address during successive operating cycles to read vector elements of each of said vector operands from said memory means; a plurality of update means for updating an address held in said address register means to an address of the next vector element each operating cycle, each update means operating independently from each other; and means for selectively enabling or inhibiting the updating of said address by each of said update means in response to said operation result.

4. A vector processing apparatus according to claim 1 wherein said control means includes compare means for comparing elements of two vector operands.

5. A vector processing apparatus according to claim 1 wherein said vector processing means includes means for selecting one of the elements in accordance with said operation result in response to said control means and for transferring the selected element to said memory means.

6. A vector processing apparatus according to claim 5 wherein said address means includes address register means for reading out the elements of the vector operands and update means for controlling whether or not to update an address held in said address register means in accordance with said operation result supplied from said control means.

* * * * *